UNITED STATES PATENT OFFICE.

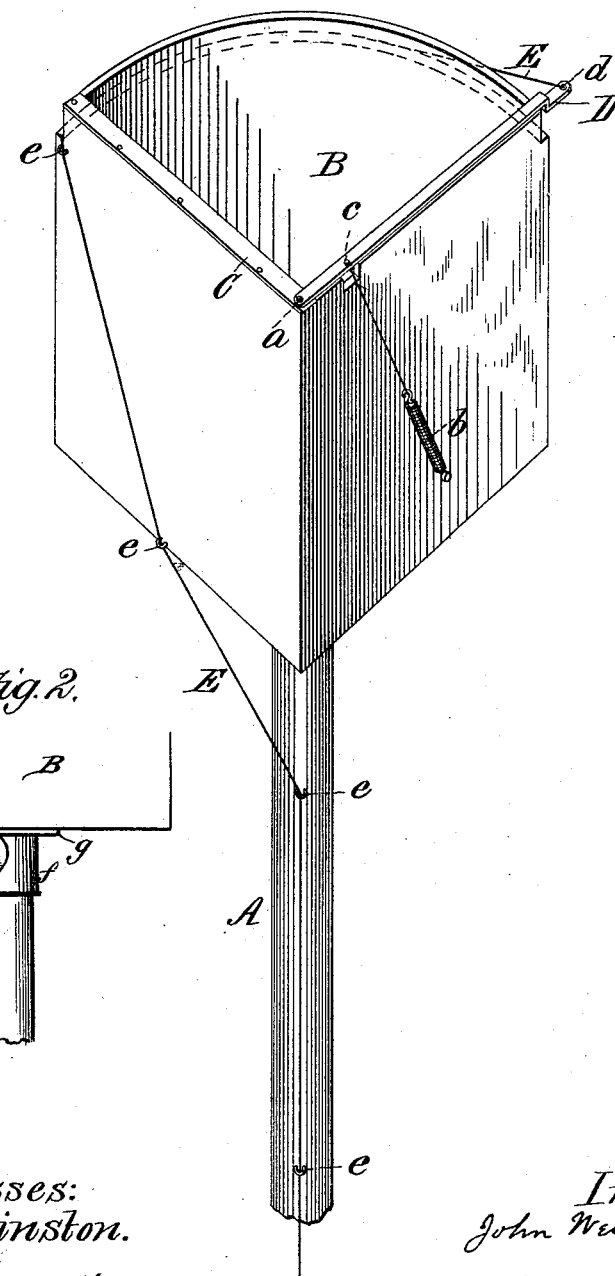

JOHN WELD PECK, OF CINCINNATI, OHIO, ASSIGNOR TO HIRAM D. PECK, OF SAME PLACE.

FRUIT-GATHERER.

SPECIFICATION forming part of Letters Patent No. 424,934, dated April 1, 1890.

Application filed September 9, 1889. Serial No. 323,452. (No model.)

*To all whom it may concern:*

Be it known that I, JOHN WELD PECK, a citizen of the United States, residing at Cincinnati, in the county of Hamilton and State of Ohio, have invented new and useful Improvements in Fruit-Gatherers, of which the following is a specification.

My invention relates to devices for gathering fruit from trees; and its object is to provide an easy means for plucking fruit from branches not easily accessible from the ground, and which at the same time will not subject the fruit to injury or destruction by falling upon the ground. I accomplish this by means of a box, basket, or other suitable receptacle for fruit, mounted upon a long pole, having at the top of the receptacle two knife-blades, one permanently attached and the other movable, so arranged that by means of a cord or wire attached to the movable blade and running down to the hand of the operator the two blades may be brought together between the fruit and its branch and cut the stem of the fruit, allowing the fruit to drop into the box, basket, or other receptacle.

Mechanism illustrating my device is shown in the accompanying drawings, in which—

Figure 1 shows the whole device in perspective. Fig. 2 is a view showing a modified construction.

Referring now more particularly to the drawings, A is a standard or pole of any desired length, upon which is mounted the receptacle B. The standard A is usually a simple pole or long stick; but, if desired, for convenience, it may be jointed after the manner of a fishing-rod. It may be attached to the fruit-receptacle B by a socket in the receptacle, or by staples, or in any of the well-known forms of attachment. It is important, however, that there should be two modes of attachment, so that the pole A may be either parallel with the bottom of the receptacle B or perpendicular to it, as the immediate convenience of use may require. This may be secured by attaching the standard A to a hinge upon a plate fastened to the bottom of the receptacle B, or by attaching to the bottom of the receptacle B a plate upon which are cast two sockets at right angles to each other, one perpendicular to the plate and the other parallel thereto, the standard A fitting closely into either socket, as may be required. A construction of this character is shown in Fig. 2, in which the reference-letters *f f* denote a duplex socket-piece attached to a base-plate *g* on the receptacle B, and having the sockets arranged at right angles one to the other. The receptacle B may be a box, bag, or basket, as desired, and it may be of any form desired.

In the drawings the form shown is that of a triangular section of a cylinder the base of whose cross-section is a quadrant of a circle. For convenience in attaching and operating the knife-blades and the cord or wire hereinafter described this shape seems most preferable; but, as before stated, this form is not essential.

C is a knife-blade, either straight or curved, permanently attached to one of the upper edges of the receptacle B. D is another knife-blade, straight or curved, (to correspond with the blade C,) pivoted at one end of the blade C and attached thereto by the pivot *a*. The blade C is of nearly the length of one side of the receptacle B. The blade D is slightly longer than a side of the receptacle B, and at the point where it passes the edge of the receptacle opposite the pivot *a* it is bent downward at right angles and again extended parallel to its first direction slightly beyond the edge of the receptacle. When not in operation, the knife-blade D should form a right angle with the blade C, and to maintain it in this position a small spring *b*, of any familiar variety, is attached to the side of the receptacle B, and also fastened to the knife-blade D at the point *c* in the side of the blade. A small slot is cut in the edge of the receptacle B near the point of attachment of the spring to the knife, as shown in the drawings, which serves as a guide for the spring. Near the outer extremity of the knife-blade D is a small eye *d*, in which is attached a cord or wire E. This cord or wire E passes around the side or sides of the receptacle B opposite the angle formed by the knives and diagonally down the side upon which is fastened the knife-blade C, and thence along the pole A to the hand of the operator. That it may be held in proper position, it passes through small staples e e e. For convenience of manipulation of the cord or wire and to prevent its slipping, the rounded side of the receptacle or the sides opposite the angle made by the knives are slightly cut away for a little distance from the upper edge, as shown, and the knife-blade D is bent as above described.

The method of operation is as follows: The receptacle B is held by the operator directly under the fruit to be gathered, with the knife-blade C just touching the stem, the blade D being held at right angles to the blade C by the spring b. As the cord or wire E is pulled, the blade D is brought into contact with the blade C, the stem of the fruit is cut, and the fruit itself drops into the receptacle B.

Having fully described my invention, what I claim, and desire to secure by Letters Patent of the United States, is—

In a fruit-gatherer, the combination of a box, basket, or other suitable receptacle for fruit, carried upon a long handle or pole, two knife-blades, one fixed and the other movable, pivoted together upon the top of the receptacle and adapted to cut the stems of fruit, and a cord or wire attached to the extremity of the movable blade opposite the extremity at which it is pivoted to the fixed blade, said cord or wire passing around the receptacle and along the handle or pole to meet the hand of the operator at the free end of the pole, substantially as set forth.

In testimony whereof I have hereunto set my hand and seal in the presence of two subscribing witnesses.

JOHN WELD PECK. [L. S.]

Witnesses:
JAMES MOLONY,
CHESTER W. MERRILL.